United States Patent [19]

Mainz

[11] 4,110,950
[45] Sep. 5, 1978

[54] INSULATING DOUBLE GLASS PANE

[75] Inventor: Franz Mainz, Dusseldorf, Germany

[73] Assignee: Gerresheimer Glas Aktiengesellschaft, Dusseldorf-Gerresheim, Germany

[21] Appl. No.: 707,213

[22] Filed: Jul. 21, 1976

[30] Foreign Application Priority Data

Jul. 22, 1975 [DE] Fed. Rep. of Germany ....... 2532634

[51] Int. Cl.² .............................................. E04D 1/04
[52] U.S. Cl. ........................................ 52/518; 52/560
[58] Field of Search ................. 52/518, 560, 535, 520, 52/578, 306–308, 172, 397, 616, 543, 593, 304, 398

[56] References Cited

U.S. PATENT DOCUMENTS

| 3,014,561 | 12/1961 | Ratner et al. | 52/578 |
| 3,127,926 | 4/1964 | Adelt | 52/520 |
| 3,555,755 | 1/1971 | Reed | 52/308 |

FOREIGN PATENT DOCUMENTS

| 74,041 | 11/1960 | France | 52/398 |
| 500,019 | 2/1920 | France | 52/553 |

Primary Examiner—James L. Ridgill, Jr.
Attorney, Agent, or Firm—Toren, McGeady and Stanger

[57] ABSTRACT

An insulating double glass pane which is intended particularly for glazing roofs such as the roofs of hothouses comprises a first pane and a second pane spaced apart from each other with spacer pieces between them around their edges. The first pane has a portion along one edge projecting beyond the second pane and the distance between the first pane and the second pane decreases from the edge at which the first pane has the projecting portion towards the opposite edge. Preferably the decrease in the distance between the panes from one edge to the other is substantially equal to the thickness of the first pane so that when two of the double panes are laid edge to edge with the projecting portion of an upper pane overlapping the upper edge of a lower pane, the outside faces of the two second panes are substantially flush with each other.

1 Claim, 5 Drawing Figures

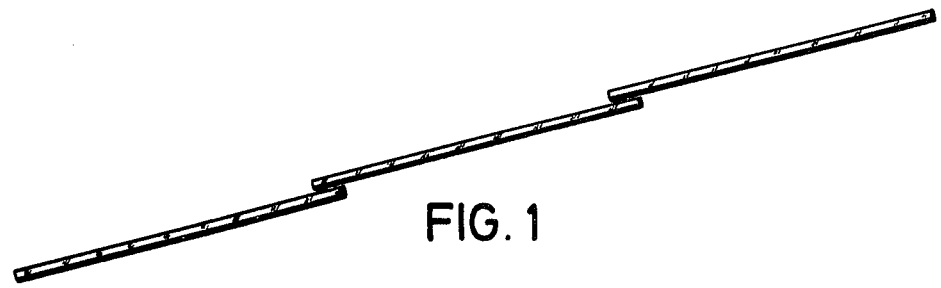
FIG. 1
FIG. 2
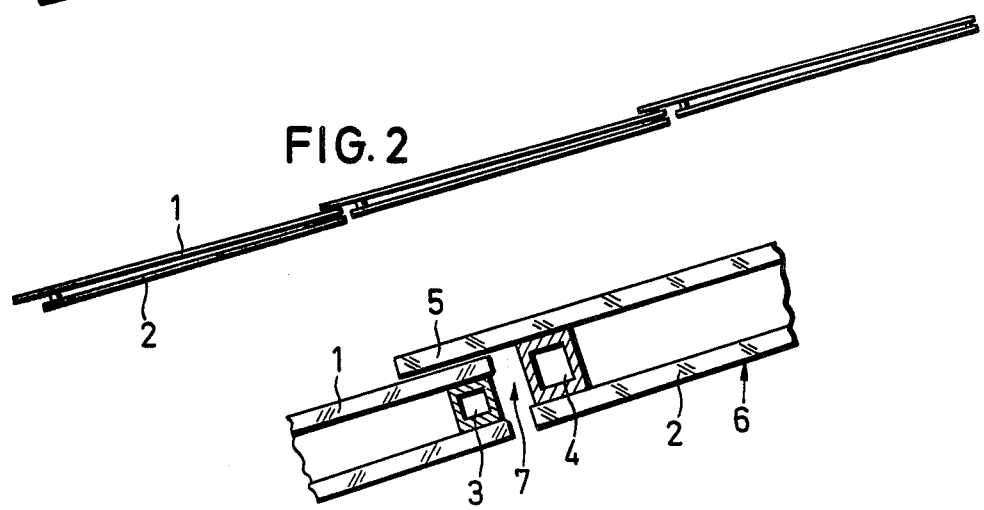
FIG. 3
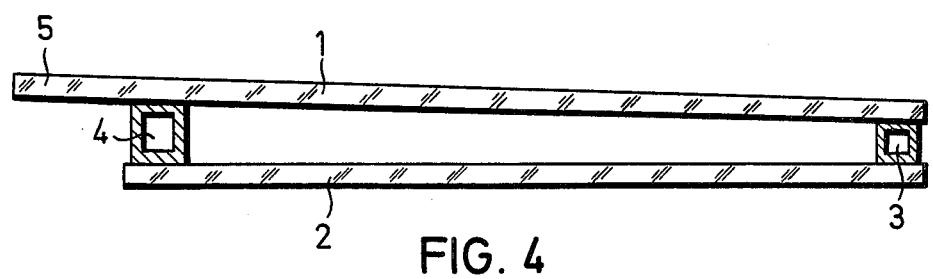
FIG. 4

INSULATING DOUBLE GLASS PANE

This invention relates to double glass panes particularly for roof glazing, for example of hothouses. Hothouses are used, for example, in nursery businesses for forcing the growth of plants. They consist of a framework usually of metal which is glazed all round. Inside hothouses temperatures prevail from about +20° C. upwards and, depending upon the kind of plants to be cultivated, only very small temperature variations may occur.

The cost of heating hothouses is very high in cold periods. The heating cost can be considerably reduced if, instead of the usual single glazing, insulating double glass panes are employed. The saving of heat loss by the use of insulating double glass panes is about 40%. Since with single glazing the individual panes of glass are usually so laid that each glass pane is overlapped by the next pane above it like shingles, and the profiles of the rafters or purlins which support the panes are shaped accordingly, considerable difficulties arise in subsequent installation of insulating glass panes of the kind at present used. Normally the panes of glass lie on rafters of, for example, T or angle section. Conventional insulating double glass panes necessarily have four to five times the thickness of single panes and hence are unsuitable for changing over from singly glazed roofs to insulating glass. Constructions with double glass panes are indeed known, but in this case the means of fastening necessary to the erection of the double panes are so complicated that subsequent installation is uneconomical. Other constructions make use of special frames for double glazing the use of which is, however, equivalent to a new installation and is therefore too costly.

Conventional forms of construction prove disadvantageous; they are either too costly or else erection is so difficult that it needs highly trained personnel. The object of the present invention is to overcome these disadvantages and provide a double glass pane for double glazing which can be installed in place of existing single panes without any alteration of the construction of the frame which supports the glazing.

To this end, according to this invention, in a double glass pane for double glazing comprising a first pane and a second pane spaced apart from each other with spacer pieces between them around their edges, the first pane has a portion along one edge projecting beyond the second pane and the distance between the first pane and the second pane decreases from the edge at which the first pane has the projecting portion towards the opposite edge.

The insulating double glass pane in accordance with the invention is consequently wedge-shaped in cross-section, that is to say it tapers down from one edge to the opposite edge. The amount of taper is preferably substantially equal to the thickness of one of the two panes.

When installing the double glass pane in accordance with the invention the projecting portion of an upper pane is laid to overlap the upper edge of the lower insulating double glass pane previously laid, that is the edge remote from the projecting portion of the lower pane. The advantage of this is that because of the overlapping no joints occur at which rainwater can collect and seep into the interior of the structure glazed with the double panes, for example, a hothouse. In addition the individual double glass panes can be made to fit with their undersides snugly against the profile of a supporting frame since the necessary oblique position of the upper pane with respect to the profile of the frame is completely counteracted by the wedge-shaped cross-section of the double glass pane. Hence no wedge-shaped gap occurs between the glazing and the frame member as would be the case with shingle-like laying of insulating glass panes having double panes parallel to each other.

An example of a double glass pane in accordance with the invention will now be described with reference to the accompanying drawings, in which:

FIG. 1 is a longitudinal section through conventional single roof glazing;

FIG. 2 is a longitudinal section corresponding to FIG. 1, but through double glass panes in accordance with the invention;

FIG. 3 is a sectional view to a larger scale through an abutment of two panes in accordance with the invention;

FIG. 4 is a longitudinal section to a larger scale through an insulating double glass pane in accordance with the invention.

Figure 5:
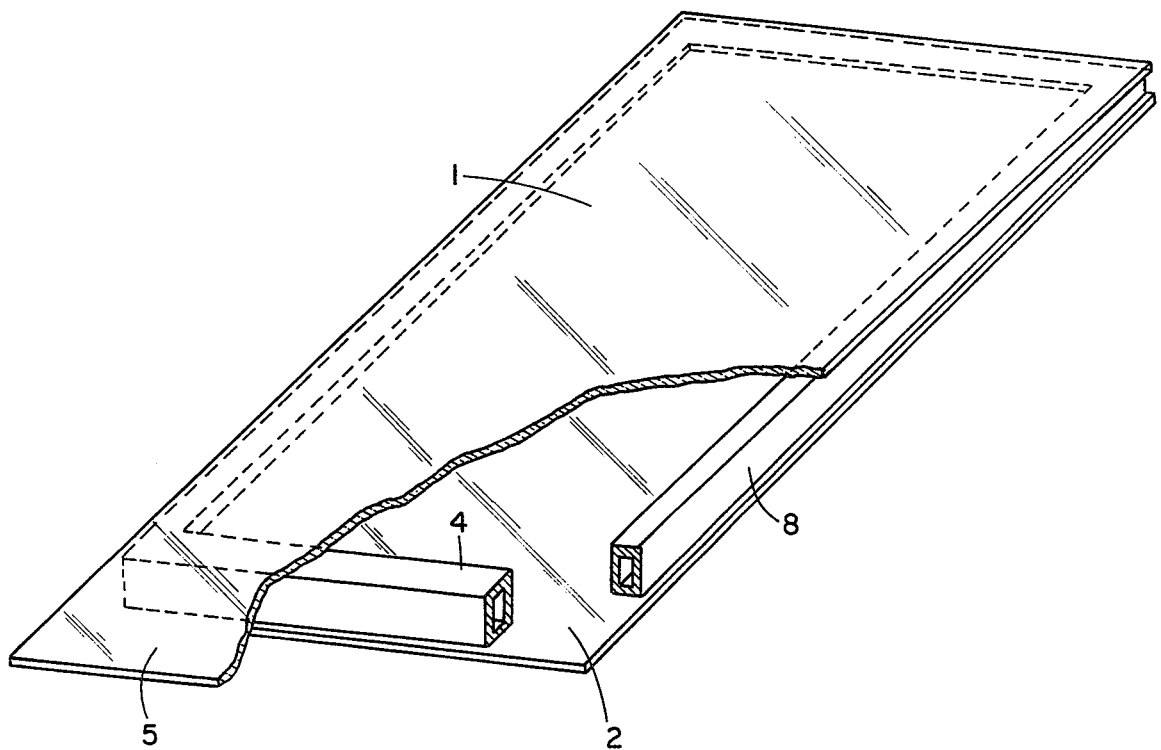
FIG. 5 is a perspective view, partly broken away, showing a double glass pane and the spacers.

The insulating double glass pane shown in the drawings comprises a first or outer pane 1 and a second or inner pane 2 which are kept apart at their edges by spacer strips 3, 4. The pane 1 has a projecting portion 5 projecting beyond the adjacent spacer strip 4 and the adjacent edge of the second pane. The spacer strips 3, 4 are so constructed in their thickness that the double pane tapers in cross-section from the edge with the projecting portion 5 to the opposite edge. The overall thickness at the opposite edge of the double glass pane corresponds with the distance of the outer surface of the projecting portion 5 from the outer face 6 of the second pane 2, that is to say the decrease in the distance between the panes is equal to the thickness of the first pane.

If two double glass panes are laid one after the other the projecting portion 5 overlaps the lower double glass pane which is the pane first laid, at its narrower end. Hence the line of abutment between the two double glass panes is effectively covered over and there is no danger of rainwater being trapped and moisture or dust getting through the joint 7 into the interior of the structure glazed with the panes.

In FIG. 5 the complete arrangements of the spacer strips is illustrated with the longer spacer strips 8 extending between the shorter spacer strips 3, 4.

The insulating double glass panes lie firmly on ordinary rafters and hence are secured against sideways displacement. They fit snugly on the two sides which run parallel with the rafters, since the oblique position of the first pane with respect to the profile of the frame is completely counteracted by the wedge-shaped cross-section of the double glass pane as a whole.

I claim:

1. A double glass pane for double glazing such as for the roof of a hothouse comprising a first flat four-sided pane, a second flat four-sided pane spaced from said first flat pane in face to face relation therewith, a closed rectangular arrangement of spacer pieces located between said first flat pane and said second flat pane adjacent the edges thereof with said first flat pane, said second flat pane and said spacer pieces defining a closed space between said panes, each of said first and second panes having a first pair and a second pair of oppositely disposed edges, the edges of each of said first pairs being aligned one opposite the other, one of the edges of each of said second pairs being aligned one opposite the other with the other one of the edges of each of said second pairs being displaced laterally out of opposite alignment with the other one of the second pair of edges of said first pane projecting laterally from the other one of the second pair of edges of said second pane, said first and second panes being in diverging relation from the oppositely aligned edges of said second pair of edges toward the other ones of said pair of edges with the spacing between said first and second panes increasing from the oppositely aligned second edges to the other second edge of said second pane by an amount substantially equal to the thickness of said first pane, said double glass panes being arranged so that in use for covering the inclined roof of a hothouse the projecting portion of the said first pane overlaps the edge of an adjacent said double glass pane formed by the oppositely aligned edges of the second pair of edges with the overlapping portion covering the joint between the adjacent said double glass panes for preventing the collection and seepage of rainwater at such joints.

* * * * *